US010055379B2

(12) United States Patent
Shin

(10) Patent No.: US 10,055,379 B2
(45) Date of Patent: Aug. 21, 2018

(54) PERIPHERAL COMPONENT INTERCONNECT EXPRESS CARD

(71) Applicant: SK hynix Inc., Gyeonggi-do OT (KR)

(72) Inventor: Seong Won Shin, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 153 days.

(21) Appl. No.: 15/207,419

(22) Filed: Jul. 11, 2016

(65) Prior Publication Data

US 2017/0011002 A1    Jan. 12, 2017

Related U.S. Application Data

(60) Provisional application No. 62/191,236, filed on Jul. 10, 2015.

(51) Int. Cl.
*G06F 3/00* (2006.01)
*G06F 13/42* (2006.01)
*G06F 3/06* (2006.01)
*G06F 13/40* (2006.01)

(52) U.S. Cl.
CPC .......... *G06F 13/4282* (2013.01); *G06F 3/065* (2013.01); *G06F 3/067* (2013.01); *G06F 3/0619* (2013.01); *G06F 13/4022* (2013.01)

(58) Field of Classification Search
CPC .............................. G06F 13/4022; G06F 3/067
See application file for complete search history.

(56) References Cited

U.S. PATENT DOCUMENTS

| 2014/0365714 | A1  | 12/2014 | Sweere et al. | |
| 2015/0064939 | A1* | 3/2015  | Rabinovitz | G06F 1/185 439/65 |
| 2015/0205541 | A1* | 7/2015  | Nishtala | G06F 3/061 711/102 |
| 2015/0309952 | A1  | 10/2015 | Breakstone et al. | |
| 2016/0335220 | A1* | 11/2016 | Breakstone | G06F 13/4068 |

* cited by examiner

*Primary Examiner* — Zachary K Huson
(74) *Attorney, Agent, or Firm* — IP & T Group LLP

(57) ABSTRACT

A peripheral component interconnect express (PCIe) card may include a base card, a mezzanine card and mezz connectors. The base card may be coupled to a host device, and host a first group of solid state drives (SSDs). The mezzanine card may be stacked over the base card, and host a second group of SSDs. The mezz connectors may couple the base card with the mezzanine card, each of the mezz connectors corresponding to each of the second group of SSDs. The base card may include an edge connector suitable for coupling with the host device, a PCIe switch suitable for coupling the first and second groups of SSDs with the host device through the edge connector, and a first group of connectors suitable for coupling the first group of SSDs with the PCIe switch. The mezzanine card may include a second group of connectors suitable for coupling the second group of SSDs.

18 Claims, 10 Drawing Sheets

PERIPHERAL COMPONENT INTERCONNECT EXPRESS CARD

CROSS-REFERENCE TO RELATED APPLICATIONS

This application claims the benefit of U.S. Provisional Application No. 62/191,236 filed Jul. 10, 2015, the contents of which is herein incorporated by reference in its entirety.

BACKGROUND

1. Field

Exemplary embodiments of the present disclosure relate to a peripheral component interconnect express.

2. Description of the Related Art

Generally, computer interfaces connect a host device to storage devices such as hard disk drives, optical drives and solid state drives (SSD). Common computer interfaces include Serial Advanced Technology Attachment (SATA) or Serial Attached Small computer system interface (SCSI) (SAS).

Due to NAND flash memory technologies, SSDs are present in many devices as an attractive option for better performance and storage. Some of the SSDs share common types of electrical and mechanical interfaces.

Recently, peripheral component interconnect (PCI) Express (PCIe) based SSDs have been standardized as the non-volatile memory (NVM) Express (NVMe) specification. Additionally, the advanced host controller interface (AHCI) is the PCIe bridging standard for SATA disks. The PCIe interface provides an efficient choice for storage appliances.

SUMMARY

Embodiments of the present disclosure are directed to a peripheral component interconnect (PCI) Express (PCIe) interface.

Aspects of the invention may include a peripheral component interconnect express (PCIe) card. The card may include a base card, a mezzanine card and mezz connectors. The base card may be coupled to a host device, and host a first group of solid state drives (SSDs). The mezzanine card may be stacked over the base card, and host a second group of SSDs. The mezz connectors may couple the base card with the mezzanine card, each of the mezz connectors corresponding to each of the second group of SSDs. The base card may include an edge connector suitable for coupling with the host device; a PCIe switch suitable for coupling the first and second groups of SSDs with the host device through the edge connector; and a first group of connectors suitable for coupling the first group of SSDs with the PCIe switch. The mezzanine card may include a second group of connectors suitable for coupling the second group of SSDs.

Other aspects of the invention may include a data processing system having a host device and a peripheral component interconnect express (PCIe) card suitable for being coupled to the host device. The card may include a base card, a mezzanine card and mezz connectors. The base card may be coupled to a host device, and host a first group of solid state drives (SSDs). The mezzanine card may be stacked over the base card, and host a second group of SSDs. The mezz connectors may couple the base card with the mezzanine card, such that each of the mezz connectors correspond to each of the second group of SSDs. The base card may include an edge connector suitable for coupling with the host device; a PCIe switch suitable for coupling the first and second groups of SSDs with the host device through the edge connector; and a first group of connectors suitable for coupling the first group of SSDs with the PCIe switch. The mezzanine card may include a second group of connectors suitable for coupling the second group of SSDs.

DETAILED DESCRIPTION

Figure 1:
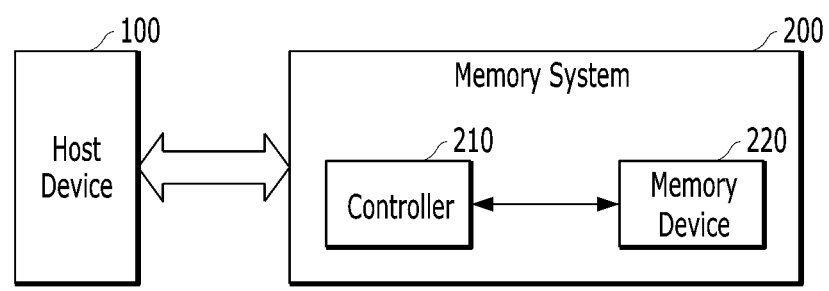
FIG. 1 illustrates a diagram of a data processing system, to which embodiments of the present invention may be applied.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A PCI Express (PCIe) card electromechanical specification, for example, PCI Express revision 1.0 as of July 2002 defines PCIe slot add-in-card (AIC) requirements and specifications. PCIe slots have been one of the major components in industry for more than a decade. Most enterprise servers have one or more PCIe slots that can be used for various purposes including storage expansion, network interface expansion, and any value added hardware offloading or acceleration modules. In the storage industry, a more space saving M.2 form factor or next generation form factor has recently been introduced along with a NVM express (NVMe) solid state drive (SSD) standard, for example, NVMe revision 1.2 as of November 2014. Unfortunately, the M.2 form factor cannot be plugged into the legacy PCIe slots. An interposer for the M.2 SSD for the conventional PCIe slot for storage expansion is therefore needed. Some embodiments are described herein that provide a high density option by hosting multiple M.2 SSDs on a single PCIe AIC. Embodiments may be applied to a data processing system shown in FIG. 1.

Referring to FIG. 1, the data processing system may include a host device 100 and a memory system 200. The memory system 200 may be called as a data storage.

The host device 100 may be implemented as any one of various kinds of electronic devices. In some embodiments, the host device 200 may include an electronic device such as a desktop computer, a workstation, a three-dimensional (3D) television, a smart television, a digital audio recorder, a digital audio player, a digital picture recorder, a digital picture player, a digital video recorder and a digital video player.

The memory system 200 may operate in response to a request from the host device 100, and in particular, store data to be accessed by the host device 100.

The memory system 200 may include a controller 210 and a memory device 220. The controller 210 may control storage of data in the memory device 220. The memory device 220 may store data which is accessed by the host device 100.

The memory device 220 may be implemented with a volatile memory device such as a dynamic random access memory (DRAM) and a static random access memory (SRAM) or a non-volatile memory device such as a flash memory.

The controller 210 may control the memory device 220 in response to a request from the host device 100. The controller 210 may provide the data read from the memory device 220, to the host device 100, and store the data provided from the host device 100 into the memory device 220.

Figure 2:
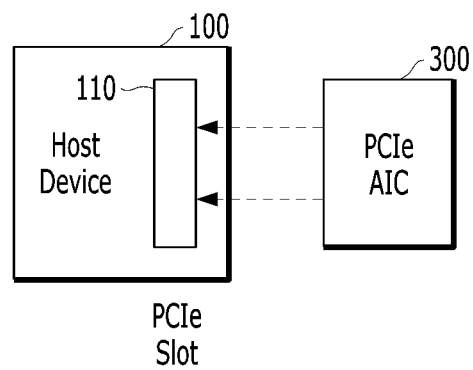
FIG. 2 is a diagram illustrating a connection between a host device and a peripheral component interconnect Express (PCIe) add-in-card (AIC) in accordance with an embodiment of the present invention.

FIG. 2 is a diagram illustrating a connection between a host device, for example, 100 of FIG. 1, and a peripheral component interconnect Express (PCIe) add-in-card (AIC) 300 in accordance with an embodiment of the present invention.

Referring to FIG. 2, the PCIe AIC 300 may be connected to the host device 100. For example, the PCIe AIC 300 may be plugged into a PCIe slot 110 formed in a certain area of the host device 100.

Embodiments are described herein for a building block for PCIe AIC based flash storage appliances and servers. Existing implementations of the SSD in PCIe AICs have one or more of the following limitations:
Limited storage capacity
Bigger capacity cards which suffer from limitations due to bulky form factors in both height and width.
Not exploiting new standard compliant M.2 SSDs
Embodiments of the PCIe AIC described herein effectively overcome these limitations by implementing one or more of the following:
PCIe standard half height, half length (HHHL) form factor
Stacked mezzanine card architecture having a high density; the optional mezzanine card can be used as additional capacity
Within a single slot boundary both in height and in inter-slot spacing
Multiple, for example, up to four, PCIe SSD modules to the host device, such as, a central processing unit (CPU) in a single PCIe mechanical slot.
On board PCIe switch provides flexibility on the configuration of the PCIe links for each SSDs to the host.

The PCIe Card Electromechanical Specification defines the characteristics and the configuration options of the PCIe AIC details. Most of the servers, for example, the host device 100 in FIG. 2 provide one or more of these standard PCIe slots for example, the PCIe slot 110 in FIG. 2 so that any optional cards can be plugged in for different applications. The PCIe based storage AIC can also be plugged in as an optional card to the system to provide high performance SSD storage. Due to the increased density of the NAND flash devices, it is now possible to provide more capacity per unit area. Some half height, half length (HHHL) PCIe AIC are available.

Figure 3:
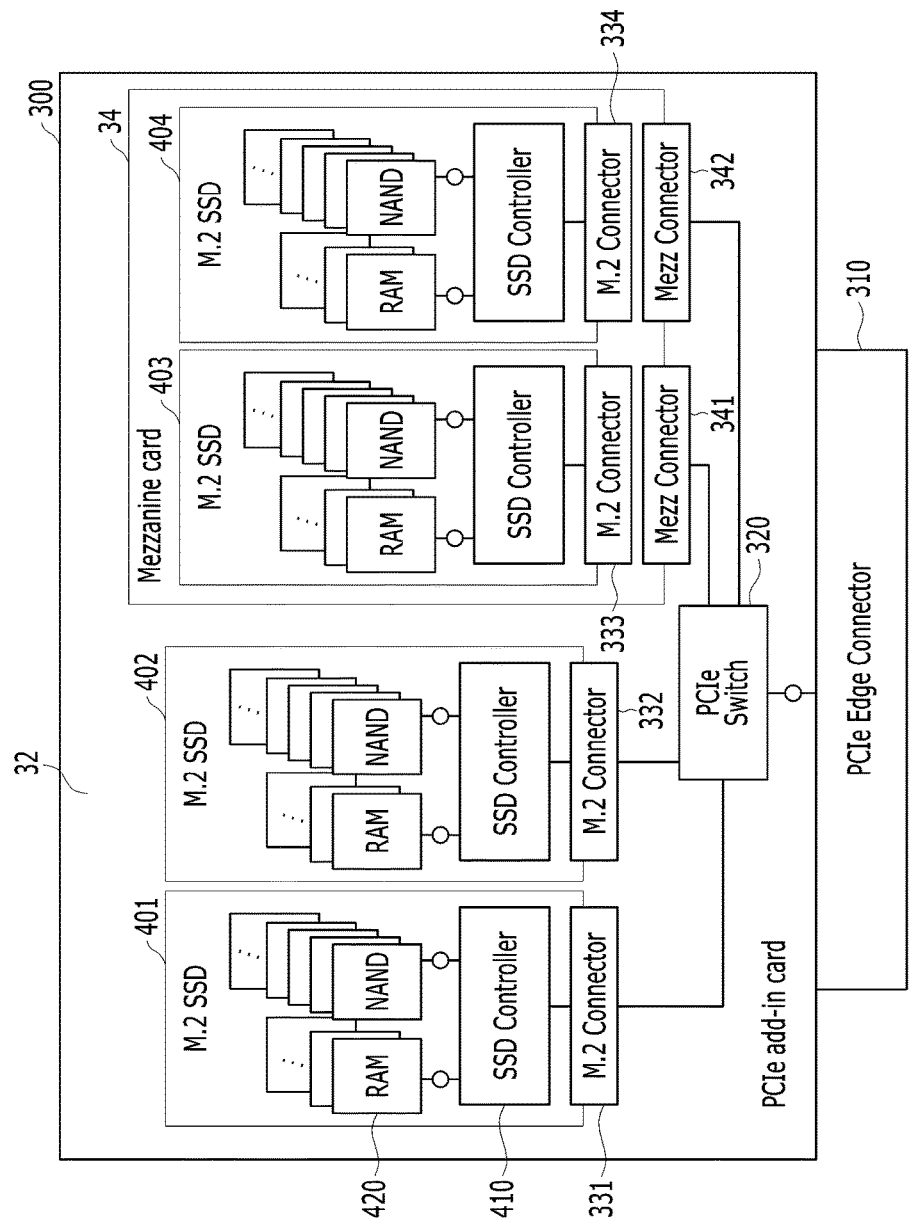
FIG. 3 is a diagram illustrating a peripheral component interconnect Express (PCIe) add-in-card (AIC) in accordance with an embodiment of the present invention.

FIG. 3 is a diagram illustrating a peripheral component interconnect Express (PCIe) add-in-card (AIC) 300 in accordance with an embodiment of the present invention.

Referring to FIG. 3, the PCIe card 300 may include a base card 32 and a mezzanine card 34. Also, the PCIe card 300 may include mezz connectors 341-342 for coupling the base card 32 with the mezzanine card 34. In some embodiments, the mezz connectors may include two mezz connectors 341-342.

The base card 32 may be coupled to a host device, for example, 100 in FIG. 2, and may host a first group of solid state drives (SSDs) (or SSD modules) 401-402. The mezzanine card 34 may be stacked over the base card 32, and may host a second group of SSDs 403-404. In some embodiments, the first group of SSDs may include two M.2 (next generation form factor (NGFF)) SSDs 401-402, and the second group of SSDs may include two M.2 SSDs 403-404. In some embodiments, the first group of SSDs 401-402 and the second group of SSDs 403-404 may have a mirroring structure. In other words, one of the first group of SSDs 401 may store a first data, and one of the second group of SSDs 403, which may be pairing with the SSD 401, may also store the first data. That is, the second group of SSDs 403-404 may be used for data backup.

The base card 32 may include a PCIe edge connector 310, a PCIe switch 320, and a first group of connectors 331-332. The PCIe edge connector 310 may couple the card 300 with the host device. In some embodiments, the PCIe edge connector 310 may be PCIe Gen3 ×8 gold fingers edge connector. The PCIe switch 320 may couple the first and second groups of SSDs 401-404 with the host device through the PCIe edge connector 310. In some embodiments, the PCIe switch 320 may include single gen3 ×8 uplink ports or dual ×4 uplink ports. The first group of connectors 331-332 may couple the first group of SSDs 401-402 with the PCIe switch 320, respectively. In some embodiments, the first group of connectors may include two M.2 connectors 331-332.

The mezzanine card 34 may include a second group of connectors 333-334. The second group of connectors 333-334 may couple the second group of SSDs 403-404 with the PCIe switch 320 through the mezz connectors 341-342, respectively. In some embodiments, each of the mezz connectors 341-342 may correspond to each of the second group of SSDs 403-404. Each of the mezz connectors 341-342 may include a receptacle disposed in the base card 32, and a plug disposed in the mezzanine card 34. In some embodiments, the second group of connectors may include two M.2 connectors 333-334, and the mezz connectors may include two mezz connectors 341-342.

Each of the first and second group of SSDs 401-404 may include an SSD controller 410, a RAM block 420, and a NAND block 430. The SSD controller 410 processes all host side interfaces via specific protocols such as the NVMe (over PCIe gen3) specifications for NVMe SSD. Also, AHCI SSD may be plugged in with a SATA host S/W driver. In some embodiments, each of the SSD controller 410 may be equipped with a single PCIe gen3 port with up to ×4 lanes. The details of each SSDs 401-404 are controller dependent and should follow vendor's reference design and are thereby omitted for simplicity.

In accordance with the non-limiting embodiments shown in FIG. 3, the PCIe card 300 includes space for four M.2 PCIe SSDs (NVMe or other) 401-404 with two on-board M.2 connectors 331-332 and two mezzanine connectors 341-342. The two M.2 connectors 331-332 on a board can host two M.2 SSDs 401-402. For storage capacity expansion, two additional M.2 SSDs 403-404 are optionally mounted in the mezzanine card 34. Each of the SSDs 401-404 does not have any dependency on each other.

At the side of the host device, for example, 100 in FIG. 2, the PCIe card 300 is recognized as four independent SSDs 401-404. For hot plug operations, the four SSDs 401-404 share the single hot plug entity represented by the single PCIe slot, for example, 110 in FIG. 2, which is handled by the host side hot plug software (S/W) stack.

In some embodiments, the card's role to each SSD is to provide signals in accordance with the PCIe M.2 specification. A single 6-port PCIe device may be installed on the card 300 to distribute and aggregate each of the ×4 PCIe signals from/to the SSDs 401-404. The PCI slot interface may be in PCIe gen3 ×8, which is used an uplink for the SSDs 401-404. The on-board PCIe switch 320 may be configured to support single gen3 ×8 or dual ×4 uplink ports depending on the motherboard switch configuration. Considering the maximum bandwidth of each M.2 is much lower than the ×4 interface bandwidth, the ×8 uplink for all four M.2 SSDs 401-404 is sufficient enough to provide the aggregated throughput for most possible sequential workload operations.

In some embodiments, the dimension of the M.2 SSDs 401-404 that may be hosted by the card 300, can be up to the maximum length 22110 (22 mm×110 mm) as defined by the M.2 specifications. The card 300 contains the mounting holes (not shown) for 2260, 2280 and 22110 respectively so that any size of the M.2 cards can be mounted. The card 300 accepts single ×8 or two of the ×4 PCI lanes from the slot of the host device, for example, PCIe slot 110 in FIG. 2. The PCIe switch 320 on the board, that is, the base card 32 or the card 300 may be configured by simple configuration changes by a configuration EEPROM to support either single ×8 uplink or bifurcation by ×4. In bifurcation mode, each of the two uplinks have two SSDs, for example, SSDs 401-402 or 403-404, as its downlinks, which may be also configurable. In some embodiments, the dimension of the PCIe AIC 300 may be a standard half height, half length (HHHL) or 64.40 (H)×167.65 (L) mm.

Figure 4A:
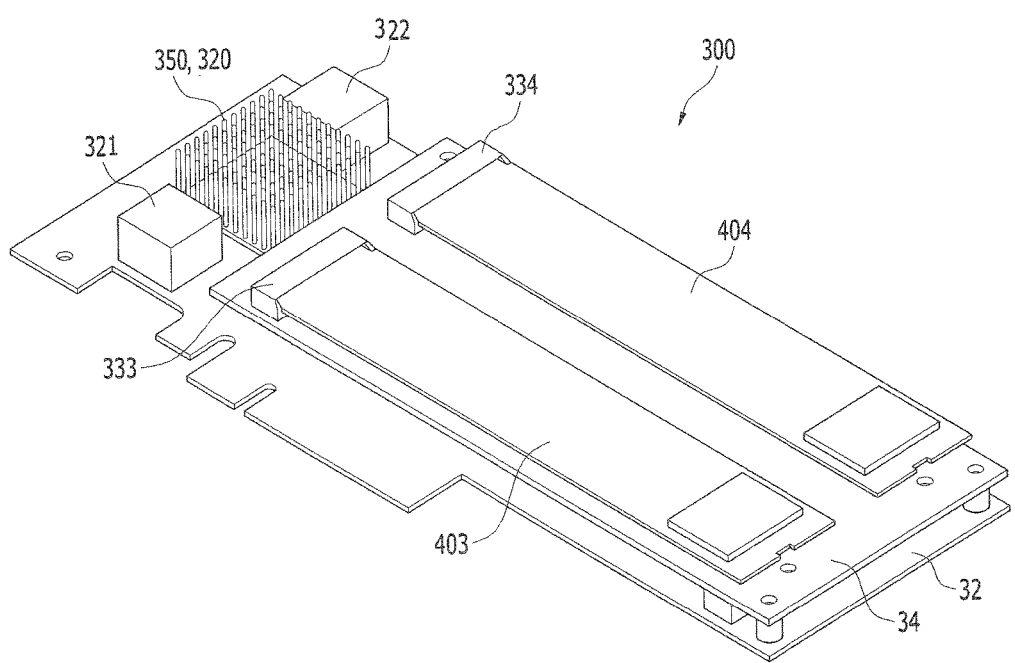
FIGS. 4A and 4B are views illustrating a stacking structure of a peripheral component interconnect Express (PCIe) add-in-card (AIC) in accordance with an embodiment of the present invention.
Figure 4B:
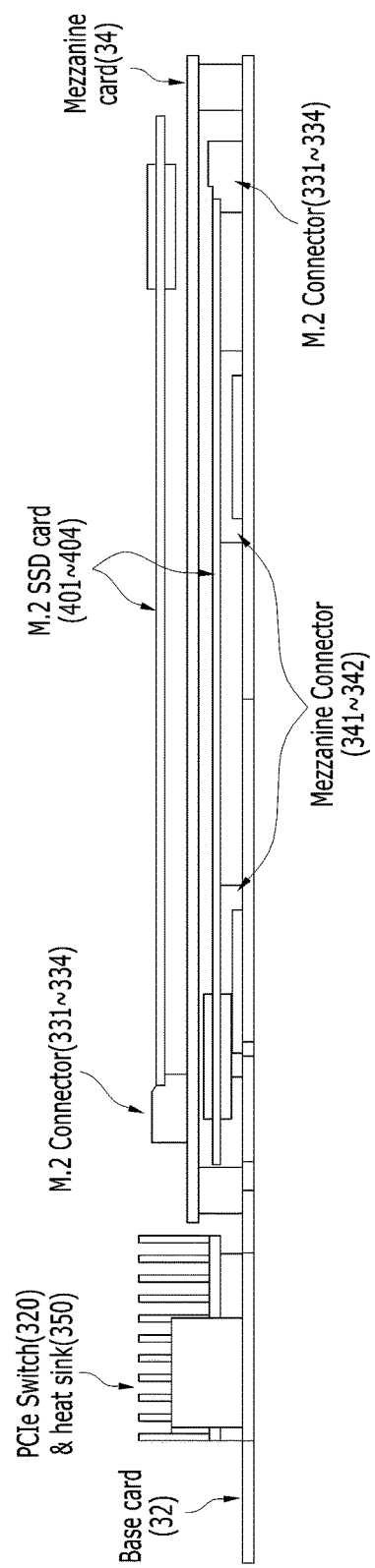

FIGS. 4A and 4B are views illustrating a stacking structure of a peripheral component interconnect Express (PCIe) add-in-card (AIC) 300 in accordance with an embodiment of the present invention.

Referring to FIGS. 4A and 4B, the PCIe card 300 may include four printed circuit boards (PCB) stacked on top of each other. That is, the PCIe card 300 includes the base card 32, two M.2 SSDs 401-402, the mezzanine card 34, and two M.2 SSDs 403-404, if installed all. The PCI Express Card Electromechanical (CEM) Specification defines the PCIe board to board spacing as 20.32 mm. In some embodiments, the height of the card 300 may be within a 14.47 mm requirement when stacked.

In the base card 32, two M.2 connectors 331-332 and the PCIe switch 320 with a heat sink 350 are disposed, and two M.2 SSDs 401-402 may be hosted. Additionally, the PCIe edge connector 310 may be disposed in the base card 32. The heat sink 350 of the PCIe switch 320 may be designed not to exceed the height limitation of the card 300. Two DC-DC converters 321 and 322 may be disposed both sides of the PCIe switch 320 with a heat sink 350. In some embodiments, each converter may receive the slot power, for example, 12V, and convert it into necessary on-board power supplies.

In the mezzanine card 34, two M.2 connectors 333-334 are disposed, and two M.2 SSDs 403-404 may be hosted. The mezzanine card 34 is stacked over the base card 32 by the two mezz connectors 341-342. In some embodiments, the two mezz connectors 341-342 may be two Mictor connectors, for example, 5 mm height (40 position) Mictor connectors).

Figure 5A:
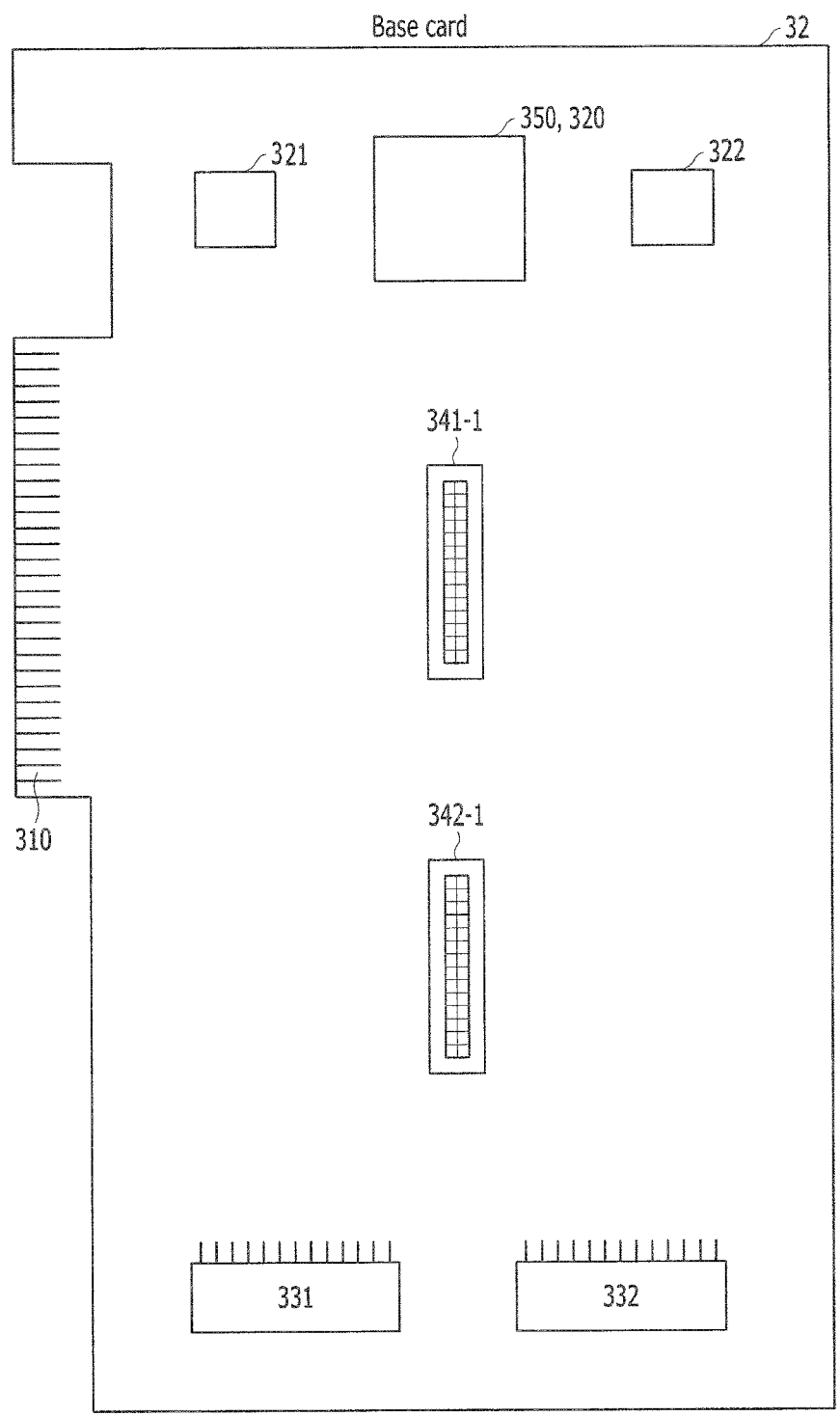
FIG. 5A illustrates a base card of a peripheral component interconnect Express (PCIe) add-in-card (AIC) in accordance with an embodiment of the present invention.

FIG. 5A illustrates a base card 32 of a peripheral component interconnect Express (PCIe) add-in-card (AIC) 300 in accordance with an embodiment of the present invention.

Referring to FIG. 5A, the base card 32 may include the PCIe edge connector 310, two M.2 connectors 331-332 and the PCIe switch 320 with a heat sink 350. Also, receptacles 341-1 and 342-1 of the two mezz connectors 341-342 may be disposed in the base card 32.

Figure 5B:
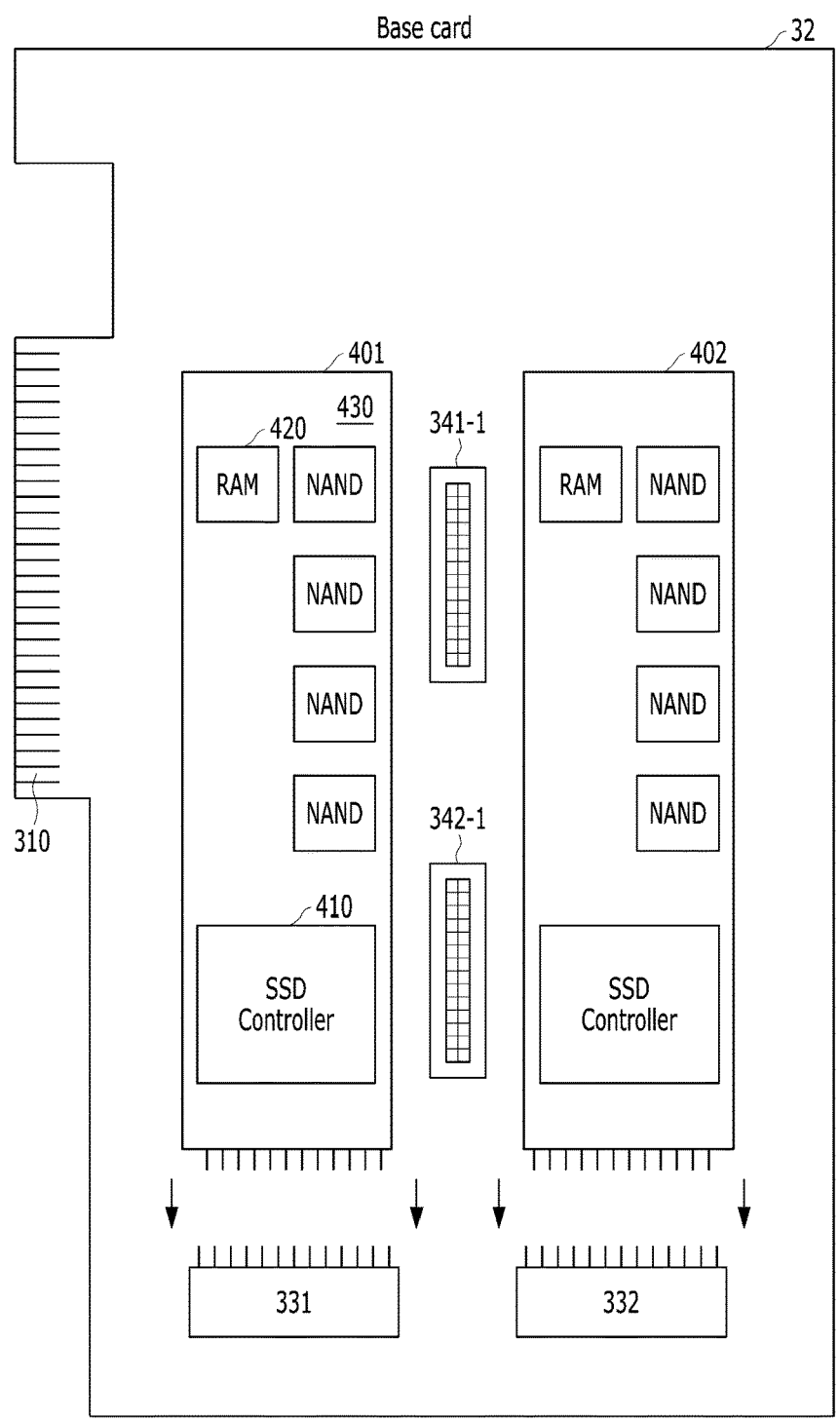
FIG. 5B illustrates a base card and two solid state drive (SSD) modules of a peripheral component interconnect Express (PCIe) add-in-card (AIC) in accordance with an embodiment of the present invention.

FIG. 5B illustrates a base card 32 and two solid state drive (SSD) modules 401-402 of a peripheral component interconnect Express (PCIe) add-in-card (AIC) 300 in accordance with an embodiment of the present invention.

Referring to FIG. 5B, two M.2 SSD modules 401-402 may be coupled with the base card 32 through the two M.2 connectors 331-332, respectively. Each of the two M.2 SSD modules 401-402 may include an SSD controller 410, a random access memory (RAM) 420, and multiple NAND flash memories 430.

Figure 5C:
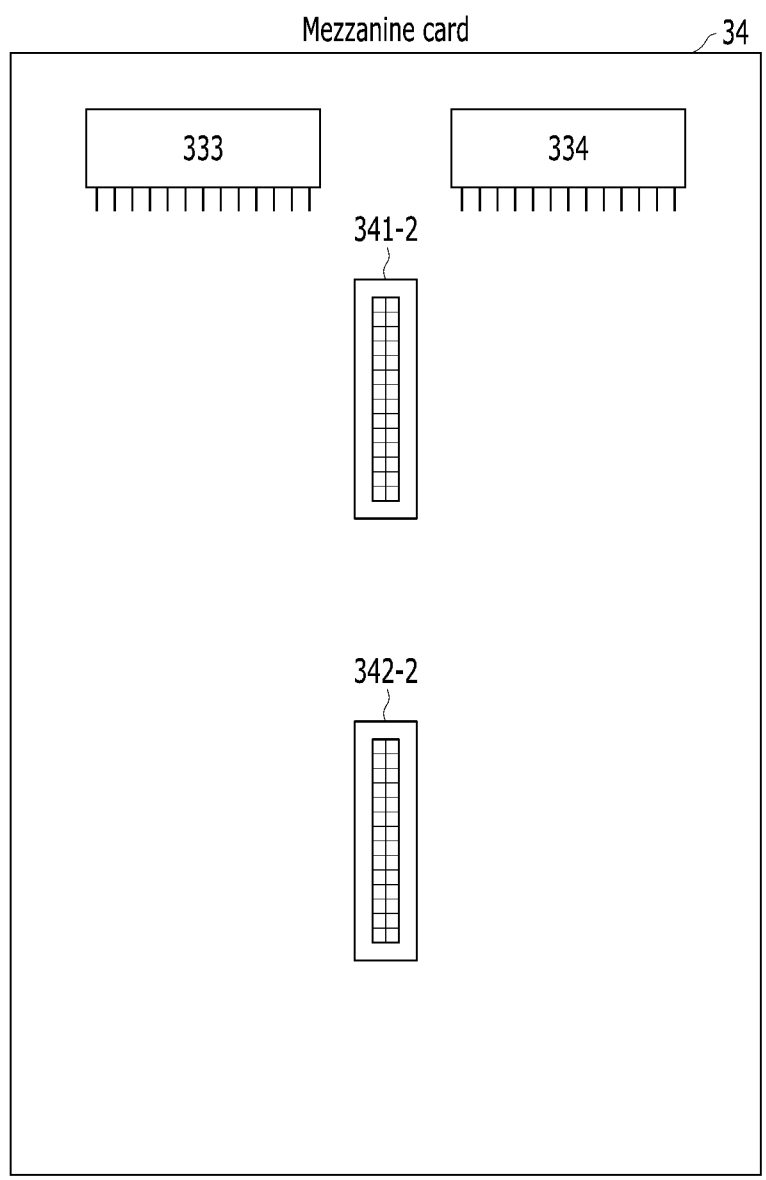
FIG. 5C illustrates a mezzanine card of a peripheral component interconnect Express (PCIe) add-in-card (AIC) in accordance with an embodiment of the present invention.

FIG. 5C illustrates a mezzanine card 34 of a peripheral component interconnect Express (PCIe) add-in-card (AIC) 300 in accordance with an embodiment of the present invention.

Referring to FIG. 5C, the mezzanine card 34 may include two M.2 connectors 333-334 and plugs 341-2 and 342-2 of the two mezz connectors 341-342. The mezzanine card 34 is stacked over the base card 32 by the two mezz connectors 341-342. That is, plugs 341-2 and 342-2 of the two mezz connectors 341-342 in the mezzanine card 34 may be coupled with receptacles 341-1 and 342-1 of the two mezz connectors 341-342 in the base card 32.

Figure 5D:
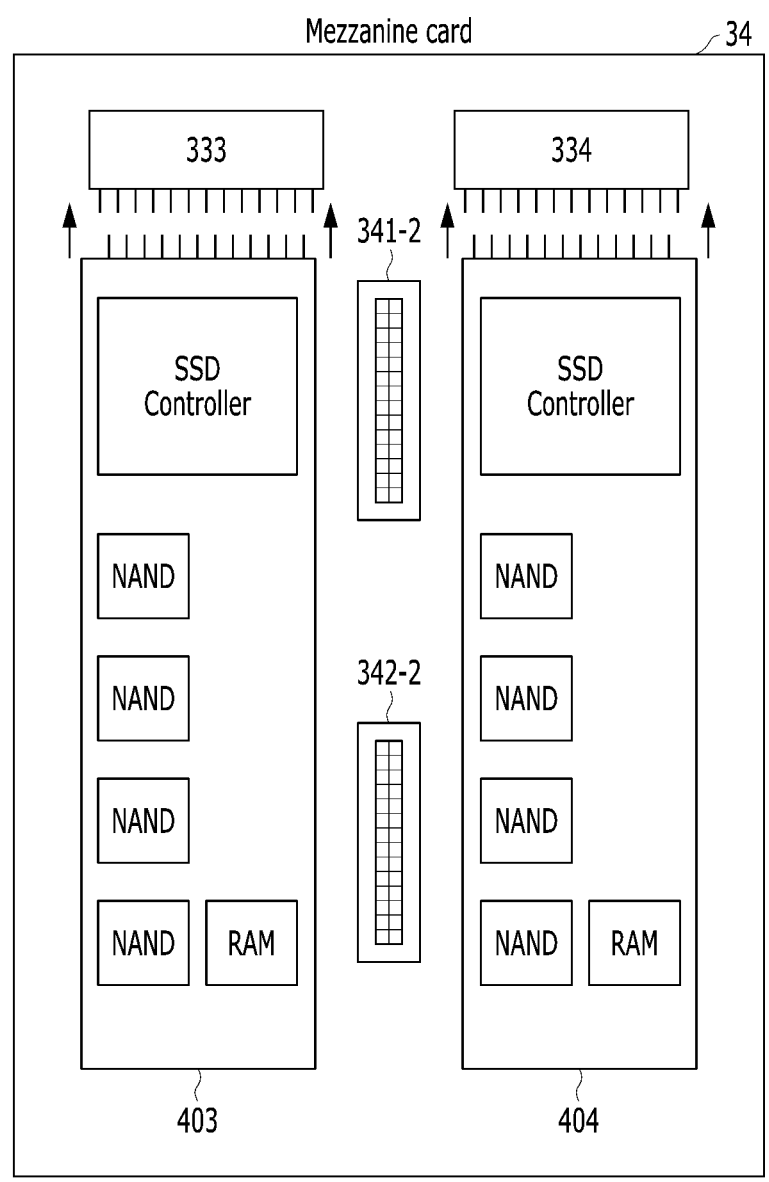
FIG. 5D illustrates a mezzanine card and two solid state drive (SSD) modules of a peripheral component interconnect Express (PCIe) add-in-card (AIC) in accordance with an embodiment of the present invention.

FIG. 5D illustrates a mezzanine card 34 and two solid state drive (SSD) modules 403-404 of a peripheral component interconnect Express (PCIe) add-in-card (AIC) 300 in accordance with an embodiment of the present invention.

Referring to FIG. 5D, two M.2 SSD modules 403-404 may be coupled with the mezzanine card 34 through the two M.2 connectors 333-334, respectively. Each of the two M.2 SSD modules 403-404 may include an SSD controller, a random access memory (RAM), and multiple NAND flash memories.

Figure 6:
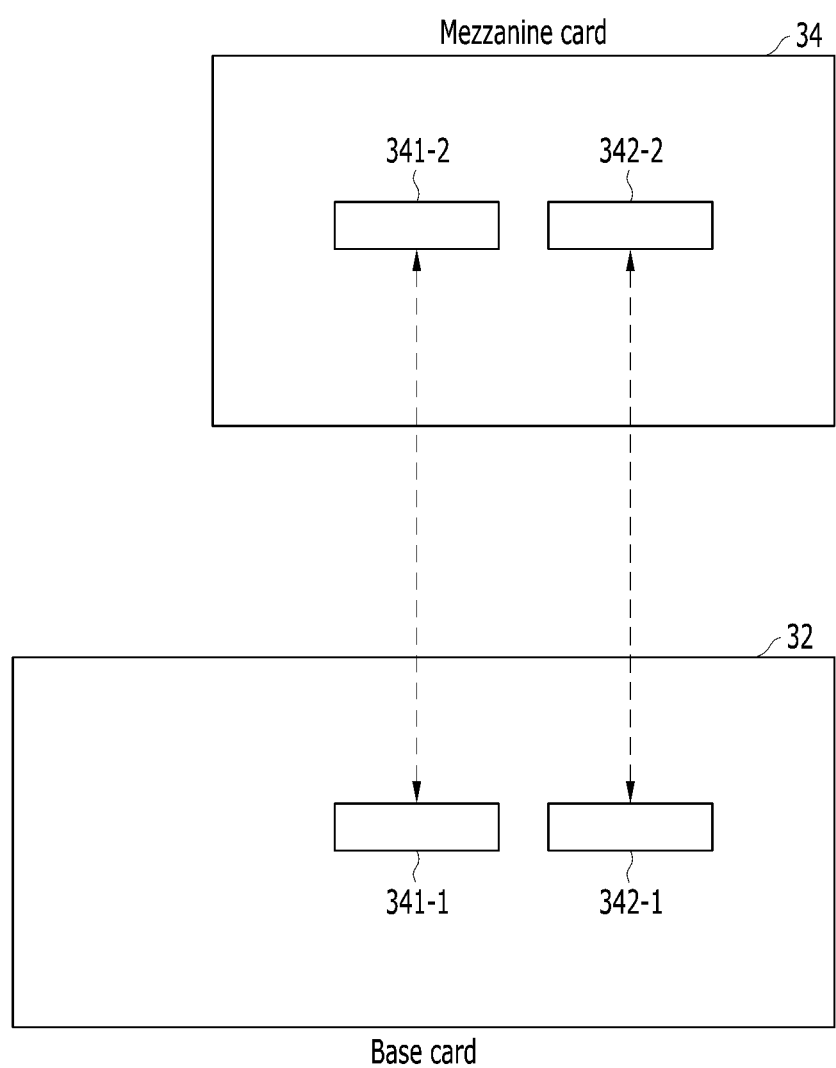
FIG. 6 is a diagram illustrating a connection between a base card and a mezzanine card of a peripheral component interconnect Express (PCIe) add-in-card (AIC) in accordance with an embodiment of the present invention.

FIG. 6 is a diagram illustrating a connection between a base card and a mezzanine card of a peripheral component interconnect Express (PCIe) add-in-card (AIC) 300 in accordance with an embodiment of the present invention.

Referring to FIG. 6, the base card 32 and the mezzanine card 34 may be coupled with each other. That is, the mezzanine card 34 is stacked over the base card 32 by the two mezz connectors 341-342. Plugs 341-2 and 342-2 of the two mezz connectors 341-342 in the mezzanine card 34 may be plugged into receptacles 341-1 and 342-1 of the two mezz connectors 341-342 in the base card 32.

Figure 7:
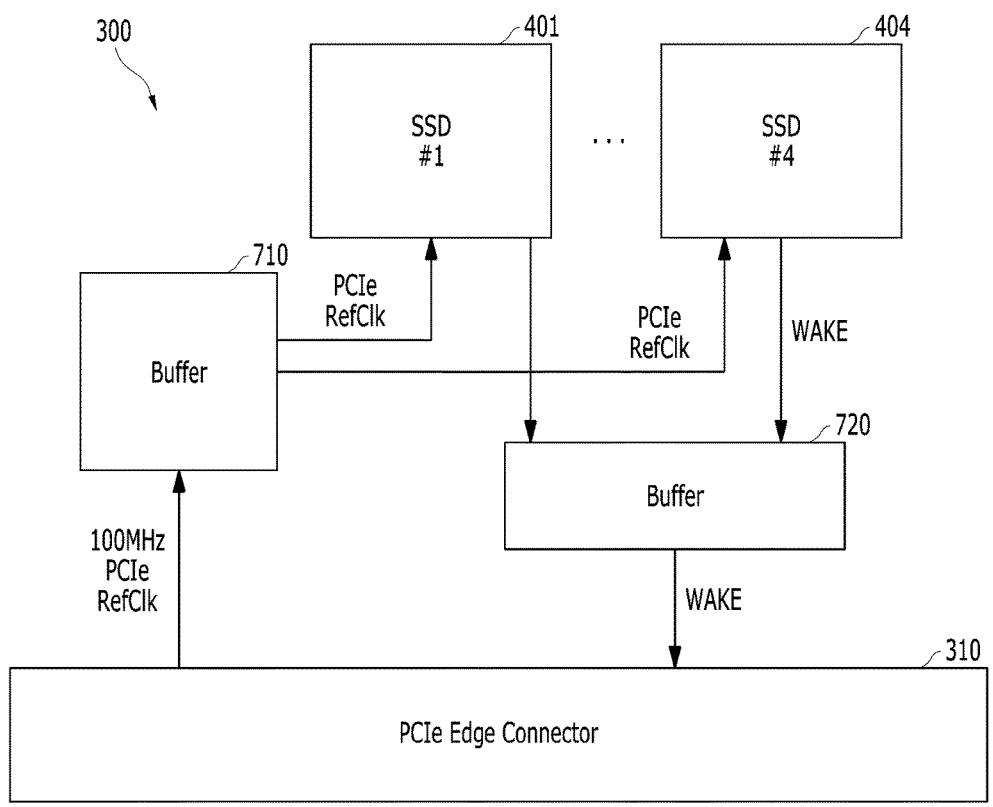
FIG. 7 is a diagram illustrating edge signals of a peripheral component interconnect Express (PCIe) add-in-card (AIC) in accordance with an embodiment of the present invention.

FIG. 7 is a diagram illustrating edge signals of a peripheral component interconnect Express (PCIe) add-in-card (AIC) 300 in accordance with an embodiment of the present invention.

Referring to FIG. 7, two buffers 710 and 720 may exist between a PCIe edge connector 310 and four SSD modules 401-404. In some embodiments, the buffers 710 and 720 may be implemented in the PCIe switch 320 in FIG. 3. The buffer 710 includes, for example, a clock fan-out buffer or clock multiplexer and the buffer 720 includes, for example, a wired OR circuit or open-collector circuit.

The buffer 710 may receive a reference clock, for example, 100 MHz PCIe RefClk, from a host device for example, 100 in FIG. 2 through the edge connector 310 and distribute the reference clock to each of the SSD modules 401-404. That is, the card 300 receives the PCIe reference clock from the slot of the host device and distributes it to the SSD modules 401-404 through the base card M.2 connectors 331-332 and the mezzanine card connectors 341-342 as illustrated in FIG. 3. The single reference clock is used to generate four reference clocks for both of the ×4 ports for each controller of the SSD modules 401-404. The buffer 710 may be a clock fan-out buffer. In the some embodiment, depending on the arrangement of SSD modules or the arrangement of buses, various delay circuits may be implemented in the buffer or edge connector to compensate a time delay.

The buffer 720 is for thee signals from the SSD modules 401-404, combine the received signals and provide the single combined signal to the host device through the edge connector 310. For the optional power management, each SSD 401-404 supports an optional WAKE signal, which is combined to provide a single WAKE signal between the SSDs and the slot of the host device. In some embodiments, the signals may be a wake signal WAKE. The buffer 720 may be implemented with a wired-OR gate for WAKE signal handling. The operation of the SSDs in the card 300 upon the WAKE signal assertion may require the matching with the host side module, when it is implemented.

As described above, the embodiments propose a mezzanine stacked card. The mezzanine stacked card is essential to achieve high storage capacity per slot in a given number of PCIe slots in the PCIe slot based flash array. A standard form factor based approach eliminates any unnecessary overhead in designing and maintenance efforts and can easily be a part of ecosystem having many benefits.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A peripheral component interconnect express (PCIe) card comprising:
   a base card suitable for being coupled to a host device, and hosting a first group of solid state drives (SSDs);
   a mezzanine card suitable for being stacked over the base card, and hosting a second group of SSDs; and
   mezz connectors suitable for coupling the base card with the mezzanine card, each of the mezz connectors corresponding to a respective one SSD of the second group of SSDs,
   wherein the base card includes:
   an edge connector suitable for coupling with the host device;
   a PCIe switch suitable for coupling the first and second groups of SSDs with the host device through the edge connector; and
   a first group of connectors suitable for coupling the first group of SSDs with the PCIe switch,
   wherein the mezzanine card includes:
   a second group of connectors suitable for coupling the second group of SSDs with the PCIe switch.

2. The PCIe card of claim 1, wherein each of the mezz connectors includes:
   a receptacle disposed in the base card; and
   a plug disposed in the mezzanine card.

3. The PCIe card of claim 1, wherein each of the first and second group of SSDs includes two SSDs.

4. The PCIe card of claim 1, wherein each of the first group of connectors couples a respective SSD of the first group of SSDs with the PCIe switch, and each of the second group of connectors couples a respective SSD of the second group of SSDs with the PCIe switch.

5. The PCIe card of claim 1, wherein the PCIe switch includes single gen3×8 or dual ×4 uplink ports.

6. The PCIe card of claim 1, further comprising a heat sink disposed in the base card.

7. The PCIe card of claim 1, wherein the PCIe switch includes a buffer suitable for receiving a reference clock from the host device through the edge connector and distributing the reference clock to each of the first and second group of SSDs.

8. The PCIe card of claim 1, wherein the PCIe switch includes a buffer suitable for receiving signals from the first and second group of SSDs, combining the signals and providing the single combined signal to the host device through the edge connector.

9. A peripheral component interconnect express (PCIe) card comprising:
 a base card suitable for being coupled to a host device, and hosting a first group of solid state drives (SSDs);
 a mezzanine card suitable for being stacked over the base card, and hosting a second group of SSDs; and
 mezz connectors suitable for coupling the base card with the mezzanine card, each of the mezz connectors corresponding to a respective SSD of the second group of SSDs,
 wherein the base card includes:
 an edge connector suitable for coupling with the host device;
 a PCIe switch suitable for coupling the first and second groups of SSDs with the host device through the edge connector; and
 a first group of connectors suitable for coupling the first group of SSDs with the PCIe switch,
 wherein the mezzanine card includes:
 a second group of connectors suitable for coupling the second group of SSDs with the PCIe switch,
 wherein the first and second group of SSDs are arranged in a mirroring structure and the second group of SSDs stores the same data to be stored in the first group of SSDs as backup data.

10. A data processing system comprising:
 a host device; and
 a peripheral component interconnect express (PCIe) card suitable for being coupled to the host device,
 wherein the PCIe card includes:
 a base card suitable for being coupled to the host device, and hosting a first group of solid state drives (SSDs);
 a mezzanine card suitable for being stacked over the base card, and hosting a second group of SSDs; and
 mezz connectors suitable for coupling the base card with the mezzanine card, each of the mezz connectors corresponding to a respective SSD of the second group of SSDs,
 wherein the base card includes:
 an edge connector suitable for coupling with the host device;
 a PCIe switch suitable for coupling the first and second groups of SSDs with the host device through the edge connector; and
 a first group of connectors suitable for coupling the first group of SSDs with the PCIe switch,
 wherein the mezzanine card includes:
 a second group of connectors suitable for coupling the second group of SSDs with the PCIe switch.

11. The data processing system of claim 10, wherein the host device includes a peripheral component interconnect express (PCIe) slot suitable for coupling with the edge connector of the PCIe card.

12. The data processing system of claim 10, wherein each of the mezz connectors includes:
 a receptacle disposed in the base card; and
 a plug disposed in the mezzanine card.

13. The data processing system of claim 10, wherein each of the first and second group of SSDs includes two SSDs.

14. The data processing system of claim 10, wherein each of the first group of connectors couples a respective SSD of the first group of SSDs with the PCIe switch, and each of the second group of connectors couples a respective SSD of the second group of SSDs with the PCIe switch.

15. The data processing system of claim 10, wherein the PCIe switch includes single gen3 ×8 or dual ×4 uplink ports.

16. The data processing system of claim 10, further comprising a heat sink disposed in the base card.

17. The data processing system of claim 10, wherein the PCIe switch includes a buffer suitable for receiving a reference clock from the host device through the edge connector and distributing the reference clock to each of the first and second group of SSDs.

18. The data processing system of claim 10, wherein the PCIe switch includes a buffer suitable for receiving signals from the first and second group of SSDs, combining the signals and providing the single combined signal to the host device through the edge connector.

* * * * *